United States Patent
Thangam et al.

(10) Patent No.: US 8,929,661 B2
(45) Date of Patent: Jan. 6, 2015

(54) SYSTEM AND METHOD FOR MEASURING CAMBER ON A SURFACE

(75) Inventors: Sivaram Vargheese Thangam, Tamil Nadu (IN); Harikrishna Gandhinagara Narayana Rai, Bangalore (IN); Sunil Arora, Ludhiana (IN)

(73) Assignee: Infosys Limited, Bangalore (IN)

( * ) Notice: Subject to any disclaimer, the term of this patent is extended or adjusted under 35 U.S.C. 154(b) by 492 days.

(21) Appl. No.: 13/215,171

(22) Filed: Aug. 22, 2011

(65) Prior Publication Data
US 2013/0004080 A1    Jan. 3, 2013

(30) Foreign Application Priority Data

Jun. 29, 2011   (IN) ........................... 2191/CHE/2011

(51) Int. Cl.
| G06K 9/46 | (2006.01) |
| G06K 9/66 | (2006.01) |
| G06T 7/00 | (2006.01) |
| G06T 7/60 | (2006.01) |
| B21B 38/00 | (2006.01) |

(52) U.S. Cl.
CPC .............. *G06T 7/0004* (2013.01); *G06T 7/604* (2013.01); *G06T 2207/30136* (2013.01); *B21B 38/00* (2013.01); *B21B 2263/30* (2013.01)
USPC ............. 382/195; 382/141; 382/152; 348/86; 702/34

(58) Field of Classification Search
CPC ....................... G06T 7/604; G06T 2207/30176
USPC ............... 382/141, 152; 348/86; 700/95, 206; 702/34
See application file for complete search history.

(56) References Cited

U.S. PATENT DOCUMENTS

| 4,519,041 A | * | 5/1985 | Fant et al. ...................... 382/141 |
| 4,528,756 A | | 7/1985 | Ichihara |
| 4,570,472 A | | 2/1986 | Kuwano |
| 4,989,164 A | * | 1/1991 | Desrousseaux ................. 702/40 |
| 5,737,074 A | * | 4/1998 | Haga et al. ................. 356/237.2 |
| 5,768,154 A | * | 6/1998 | Zelt et al. ......................... 702/97 |
| 5,996,384 A | | 12/1999 | Steeper et al. |
| 6,085,624 A | * | 7/2000 | Lever et al. ...................... 83/13 |
| 6,640,003 B1 | * | 10/2003 | Yabe ............................. 382/151 |
| 6,778,694 B1 | * | 8/2004 | Alexandre .................... 382/141 |

(Continued)

OTHER PUBLICATIONS

M. Sugiyama and M. Hamaguchi. A camber-profile gauge using a laser scanning and light-guide detection edge sensor. Iron and Steel Plant Electrical Equipment Edition, vol. 92, pp. 34-37, Dec. 2000.

(Continued)

*Primary Examiner* — Samir Ahmed
(74) *Attorney, Agent, or Firm* — Stephen M. Hertzler; Marc S. Kaufman; Reed Smith LLP

(57) ABSTRACT

The disclosed embodiment relates to methods for measuring camber on a surface. The method preferably comprises receiving, by a computing device, a plurality of images of a surface, identifying, by a computing device, a key image of the surface from the plurality of images, extracting, by a computing device, a portion of the key image including the surface, and analyzing, by a computing device, the extracted portion of the key image to thereby determine the camber on the surface. The disclosed embodiment also relates to a system and computer-readable code that can be used to implement the exemplary methods.

24 Claims, 10 Drawing Sheets

(56) References Cited

U.S. PATENT DOCUMENTS

| | | | |
|---|---|---|---|
| 7,345,698 B2* | 3/2008 | Abbott et al. | 348/86 |
| 7,570,794 B2* | 8/2009 | Swanger et al. | 382/141 |
| 8,499,821 B2* | 8/2013 | Rosenthal et al. | 164/452 |
| 2006/0070417 A1* | 4/2006 | Nieminen et al. | 72/11.7 |

OTHER PUBLICATIONS

R.J. Montague A, J. Watton B, K.J. Brownc. A machine vision measurement of slab camber in hot strip rolling. Journal of Materials Processing Technology, vol. 168, Issue 1, Sep. 15, 2005, pp. 172-180.

Arno Barry, Samuel Ferreira. Adaptive Fuzzy Logic Steering Controller for a Steckel Mill. A thesis submitted towards the partial fulfillment of the requirements for the degree Magister Ingeneriae in Electrical and Electronic Engineering. University of Johannesburg. Nov. 2005.

Hlobil, Helmut; Niel, Kurt; Prinz, Markus; Trinkl, Gerhard; Seyruck, Wolfgang; Reisinger, Johann. Camber measurement at hot strip mill at Voestalpine by using image processing method. Machine Vision Applications in Industrial Inspection XIII. Proceedings of the SPIE, vol. 5679, pp. 140-145 (2005).

C. Fraga, R.C. Gonzalez, J.A. Cancelas, J.M. Enguita, L.A. Rodriguez Loredo. Camber Measurement System in a Hot Rolling Mill. Industry Applications Conference, 2004. 39th IAS Annual Meeting. Conference Record of the 2004 IEEE.

Continuous Online Camber Measurement System.pdf.

Karel Smrcka, Engineering News—Image Processing A Booming Market, Aug. 2007 (http://www.engineeringnews.co.za/article/image-processing-a-booming-market-2007-08-03).

Karel Smrcka, Image processing a booming market, Aug. 2007 (http://a1.siemens.com/innovation/pool/en/publikationen/publications_pof/PoF_Fall_2006/Aa_Machine_Vision/Facts_and_Forecasts/pof206art45_pdf_1416524.pdf).

Industry—Facts and Forecasts (http://w1.siemens.com/innovation/en/publikationen/publications_pof/pof_fall_2002/industry_articles/facts_and_forecasts.htm).

J. C. Alvarez, A. B. Diez, D. Alvarez, J. A. Gonzalez, and F. Obeso. Thick unevenness compensation in a hot rolling mill having automatic gage control. IEEE Transactions on Industry Applications, vol. 38, No. 2, pp. 559-564, 2002.

* cited by examiner

SYSTEM AND METHOD FOR MEASURING CAMBER ON A SURFACE

RELATED APPLICATION DATA

This application claims priority to Indian Patent Application No. 2191/CHE/2011, filed Jun. 29, 2011, which is hereby incorporated by reference in its entirety.

FIELD OF THE INVENTION

The invention relates to a system and method for measuring camber on a surface.

BACKGROUND

Camber is a significant defect that occurs in hot steel slabs or strips when being rolled in mills or manufacturing plants. It is a straightness defect characterized by longitudinal curvature in the strip. Camber is caused by the lateral unstable movement of the strip in work rolls that leads the strip to curve towards a side. This defect creates clogging in the finishing stages and severely affects the quality of the produced strip which results in wastage of the produced steel.

In practice, the camber is manually eliminated by stand leveling the work rolls which makes the strip to come back in the center of the rolls. Steering control systems are system which automatically detects camber and takes measures to bring the strip back to the centerline. However, these systems rely on indirect measures such as width measurement sensors to capture the edge profile and therefore camber.

In current manufacturing practice, camber defect is qualitatively identified by the human operator and the steering control of the work rolls is adjusted to bring the strip back to the center line of the rolls. Quantitatively, camber in the defected slab can be measured by placing two magnets in the strip across the cambered portion and attach them with a string, thereby measuring the distance between the string and the concave edge. Automatic steering control systems have been developed to automate the steering process. Most of these attempts to measure the camber through indirect measures, such as placing sensors along the way of the movement of strip to get the edge profile.

Camber measurement has to be a real-time process in which the camber value is fed into the steering control to adjust the rolls for correction. So, it has to be automatic, robust, accurate, computationally inexpensive and cheap. Manual measurement is not an option to be considered as it ends up wasting good amount of produced steel. Today, manufacturing industry is targeting zero wastage policy and automation is the most sought after option. The manual technique of "magnet and string" camber measurement cannot be applied in the real-time as the steel strip is of very high temperature.

Automatic steering control systems which use sensors for detecting camber are costly and yield inaccurate measurement as they follow indirect means to measure it. Computer vision based camber measurement is considered as cheap and effective option. Few methodologies have been developed but they are either computationally expensive or not reliable. Since the processing of image frames for measuring camber has to happen on-line, lots of optimization needs to be done to reduce the computation.

SUMMARY

The disclosed embodiment relates to a method for measuring camber on a surface. The method preferably comprises receiving, by a computing device, a plurality of images of a surface, identifying, by a computing device, a key image of the surface from the plurality of images, extracting, by a computing device, a portion of the key image including the surface, and analyzing, by a computing device, the extracted portion of the key image to thereby determine the camber on the surface.

The disclosed embodiment further relates to a system for measuring camber on a surface. The system preferably comprises a computing device configured to receive a plurality of images of a surface, a computing device configured to identify a key image of the surface from the plurality of images, a computing device configured to extract a portion of the key image including the surface, and a computing device configured to analyze the extracted portion of the key image to thereby determine the camber on the surface.

The disclosed embodiment also relates to computer-readable code stored on a computer-readable medium that, when executed by a processor, performs a method for measuring camber on a surface. The method preferably comprises receiving, by a computing device, a plurality of images of a surface, identifying, by a computing device, a key image of the surface from the plurality of images, extracting, by a computing device, a portion of the key image including the surface, and analyzing, by a computing device, the extracted portion of the key image to thereby determine the camber on the surface.

As described herein, the surface may any type of surface, such as a moving surface. In addition, any of the images may be enhanced, the portion extracted from the key image may show the boundaries of the surface, any perspective distortion of the boundaries of the surface in the extracted portion of the key image may be corrected, and it may be determined whether the camber exceeds a predetermined threshold value.

DETAILED DESCRIPTION

The disclosed embodiments address the problem of measuring camber defect in hot strip rolling mills by disclosing a system and method for measuring camber in real-time. Preferably, according to the disclosed embodiment, the surface can be any type of surface, such as a moving surface. When camber measurement is done in real-time, it should be computationally inexpensive without sacrificing accuracy. False measurements in typical systems may trigger alerts, and may cause the system to stop, thereby wasting the time of production and in turn the delay in delivery of goods. The disclosed embodiments address this issue by utilizing key frame images and correcting the projecting distortion on the edges of a strip or other surface, and calculating camber on both the edges of the surface. In particular, a video input, such as a CCD camera video input installed at the mill, is used to capture images of the surface, and the system is used to measure the camber with optimized resource usage. Key image frames from the input video are selected and processed to extract the strip object from it. Once the strip object is extracted, the strip object's longitudinal edges are corrected from projective distortion, and the camber is computed.

This is an automation solution that fits into the quality aspects of the manufacturing plants to eliminate wastages and improve productivity. Hot rolling metal strip mills require this kind of real-time camber measurement solution to correct the camber defect and eliminate wastage. It is also useful in the automotive industry for chassis adjustment in assembly lines, and in the construction industry, this kind of solution can be used to measure curvature camber in beams. Furthermore, the Compact Disk drive manufacturing industry requires camber control solutions for improved slider curvature control.

Figure 1:
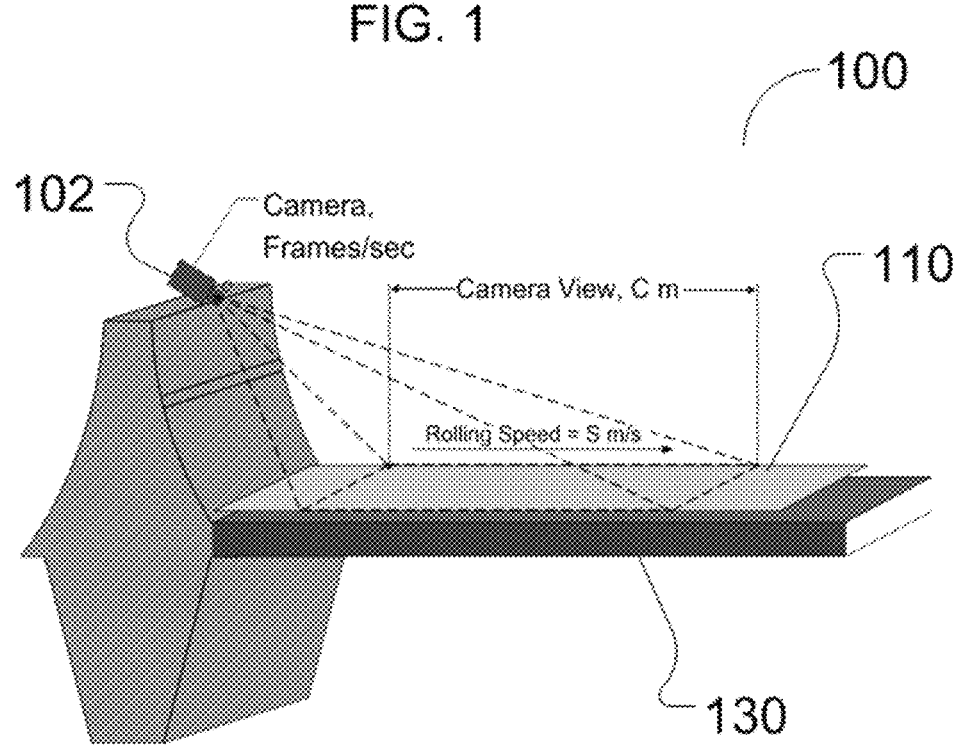
FIG. 1 illustrates an exemplary hot rolling mill with a metal strip in the transfer table and the camera positioned to capture the strip according to the disclosed embodiment.

According to the disclosed embodiment, a plurality of images of a surface 110 are received by a computing device. Surface 110 can be any type of surface, for example, a rolling surface, such as a hot rolling mill surface. The images can come from any suitable source, for example, using a CCD camera 120 which is set up in such a way that it is overlooking at the transfer table 130 at the exit of the rolls. (See FIG. 1, which shows an exemplary hot rolling mill with a metal strip in the transfer table and the camera positioned to capture the strip according to the disclosed embodiment). The images may be any sort of digital images, including still shots or images extracted from a video stream.

Figure 2:
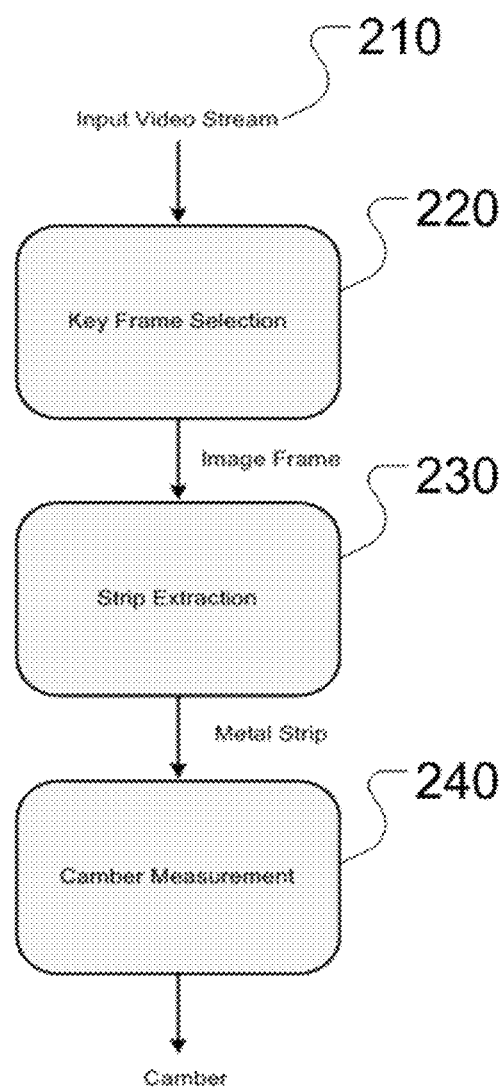
FIG. 2 is a flowchart illustrating an abstract view of the disclosed embodiment.

FIG. 2 shows a flowchart of an abstract view of the disclosed embodiment, which is explained in detail below. As is shown in FIG. 2, after the images are received in step 210, one or more key images of the surface (or key frames) are selected or identified from the plurality of images in step 220. Then, in step 230, the selected key frame image is subjected to a strip extraction. The resulting strip is used to measure the camber, in step 240.

Figure 3:
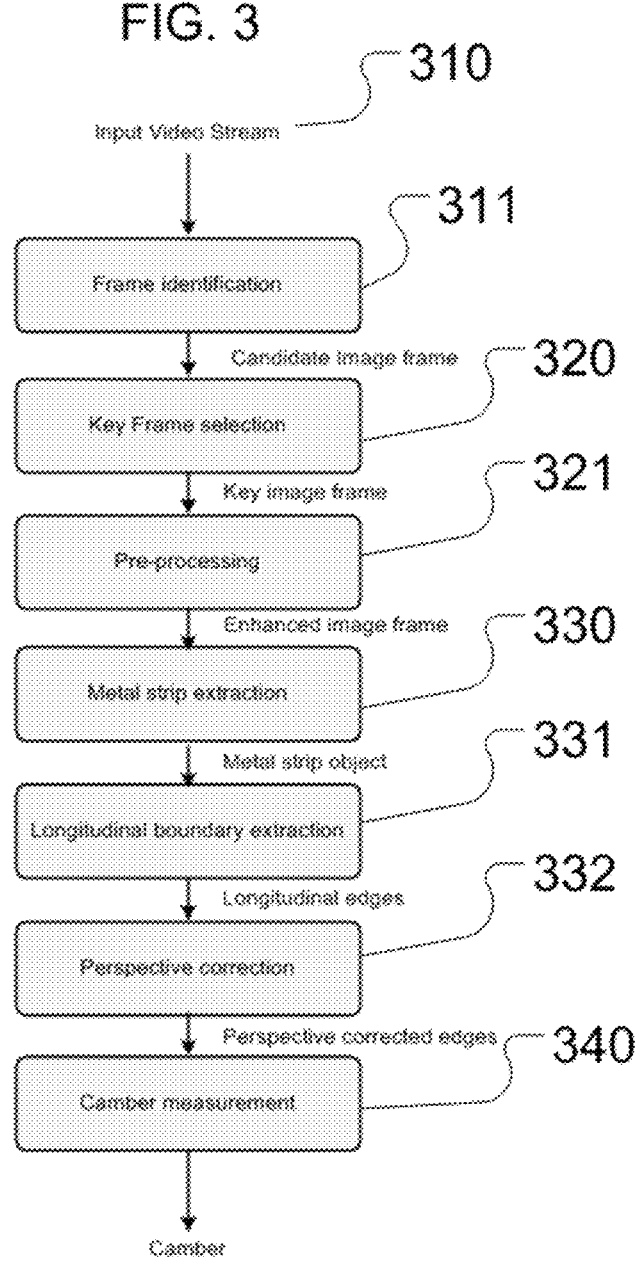
FIG. 3 is a flowchart of a method of the disclosed embodiment.

FIG. 3 shows a more detailed flowchart of a method of the disclosed embodiment. After an input video stream 310 is received, prospective frames are identified in step 311, and a key frame is selected in step 320 from the candidate image frames. The key image frame is pre-processed in step 321, and the resulting enhanced image is subjected to metal strip extraction in step 330. The longitudinal boundaries of the resulting metal strip object are extracted in step 331, and the longitudinal edges are subjected to perspective correction in step 332. The corrected edges are then used to measure the camber in step 340.

Figure 4:
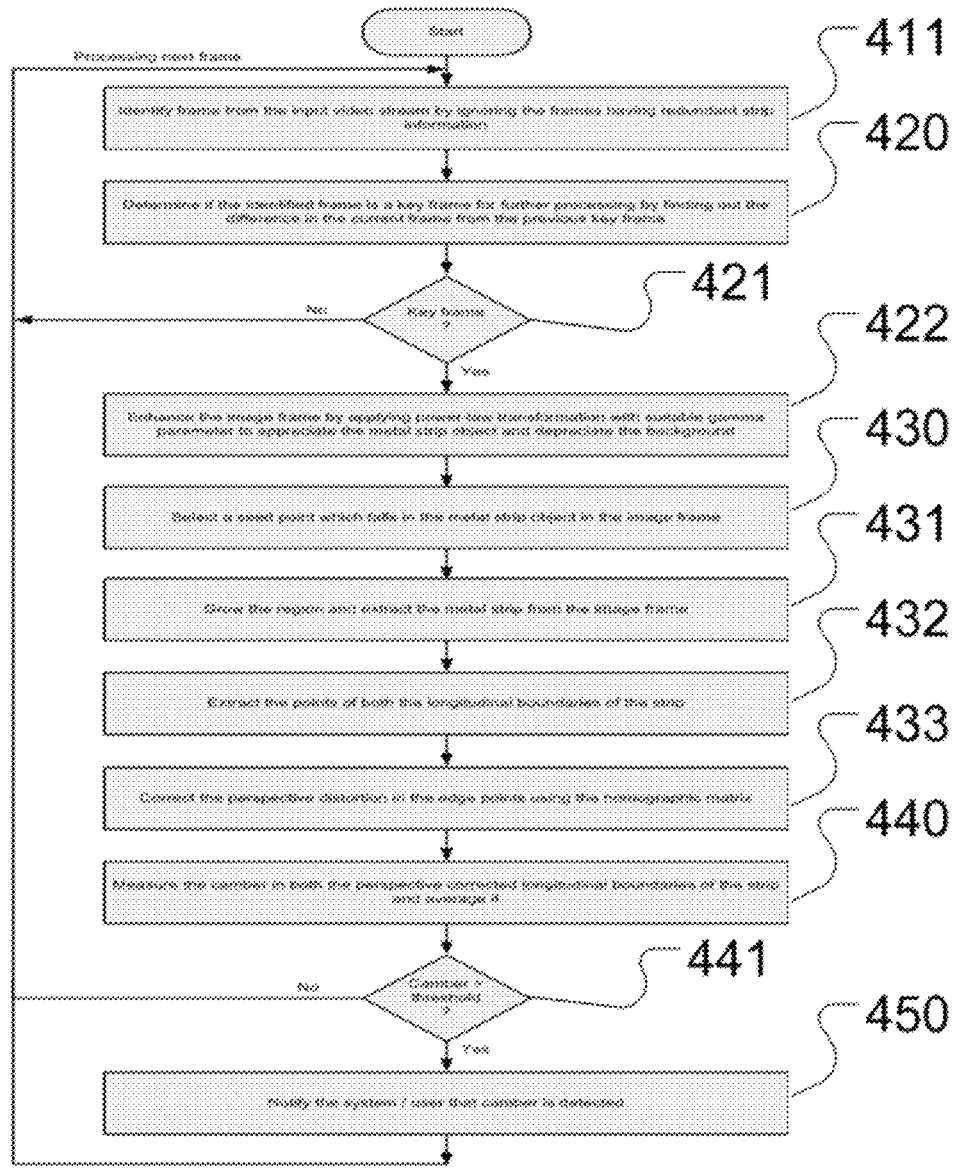
FIG. 4 is a flowchart of a method of the disclosed embodiment.

FIG. 4 shows an even more detailed flowchart of a method of the disclosed embodiment. In step 411, frames are identified from the input video stream by ignoring the frames having redundant strip information. Then, in step 420, it is determined whether the identified frame is a key frame fur further processing by finding out the difference in the frame from a previous key frame. In step 421, if the identified frame is a key frame, the processing continues. If not, the next frame is processed according to steps 411 and 420.

Image enhancement begins in step 422. First, the image frame is enhanced by applying power-law transformation with suitable gamma parameter to appreciate the metal strip object and depreciate the background. A seed point is then selected in step 430 which falls in the metal strip object in the image frame. In step 431, the region is grown, and the metal strip is extracted from the image frame. Then, in step 432, the points of the both of the longitudinal edges of the strip are extracted, and any perspective distortion in the edge points is corrected using a homographic matrix in step 433. Finally, the camber is measured in step 440 in both the perspective corrected longitudinal boundaries of the strip and averaged. If the camber exceeds a threshold allowance (step 441), the camber is reported in step 450.

The selection of image frame from the input real-time video stream for further processing (referred as key frame) can be done by ignoring the frames having redundant information of the rolling strip and the frames having no difference from the previous key frame. Thus, key image frames are chosen to avoid redundant processing and reduce the computational requirements, for example, based on the rolling mill system parameters and camera parameters. In one embodiment, the input video (which is a sequence of image frames) will likely have redundant information of the strip or surface in subsequent frames. Processing all these frames is computationally expensive and will not contribute much to the accuracy. Therefore, selecting key frames reduces the computation. The selection should be done in such a way that no information about the strip is lost with minimal or no redundancy. A formula has been derived to identify the candidate image frames from the input video based on the following parameters.

Frame Rate—
Number of image frames captured by camera. Let us say it F fps (Frames Per Second)

Rolling Bench Speed—
Speed of the transfer table on which the strip is moving. Let's say it S m/s (meters per second). Normally, this rolling speed lies in a range of ±20 m/s Field of View of Camera—
How much length of the transfer table is in view of the calibrated camera. Let's say it C meters.

S/F gives the length of strip that is captured in one frame. If N number of such frames gives the field of view of the calibrated camera, then:

$$\left(\frac{S}{F}\right) \times N = C \qquad \text{(Equation 1)}$$

Computing for N in the above equation:

$$N = \frac{C \times F}{S} \qquad \text{(Equation 2)}$$

If 1st and $(1+N)^{th}$ frames are considered, then there will be no overlapping region of strip between any two subsequent frames.

If the overlapping is required to increase the accuracy of the system, then the above equation becomes:

$$N = \frac{C \times F}{S} \times \frac{1-X}{100} \quad \text{(Equation 3)}$$

where X is the configured overlapping percentage.

After computing N using the above equation, candidate frames can be determined according to Arithmetic Progression (A.P) series where N will act as the common difference 'd' and first term 'a' as 1. So, the candidate frames identified from the input video stream will be:

$$1, 1+N, 1ZN, 1+3N, \quad \text{(Equation 4)}$$

Figure 5:
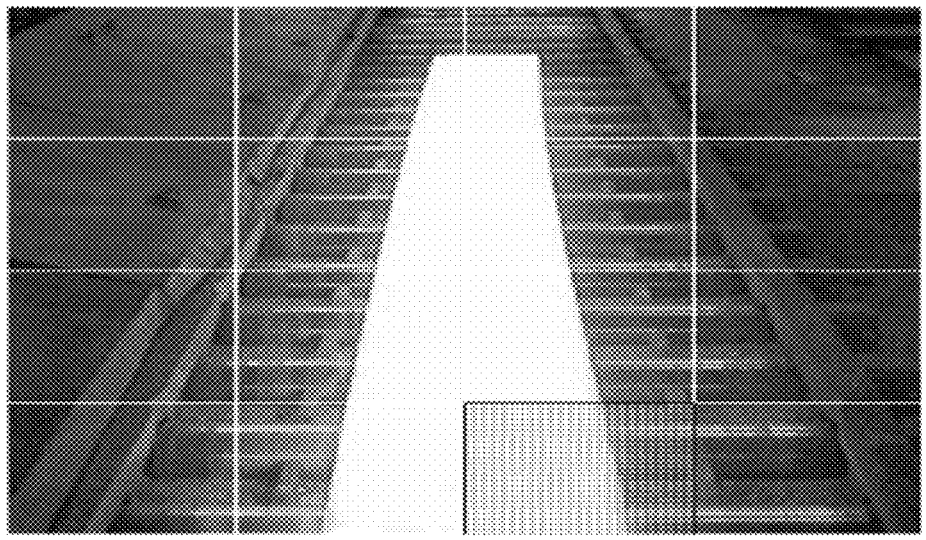
FIG. 5 shows an image of an exemplary key frame extraction according to the disclosed embodiment.

Determining if the given candidate frame is a key frame or not is a step in the frame selection process. An image frame requires processing only if it has difference from the previous processed frame (such frame is called key frame). Each candidate frame is divided into blocks of (m×n) size (See FIG. 5) and statistical mean is computed for every block and compared with the statistical mean of the corresponding block of previous key frame. If the difference is more than the set threshold, then it will be processed to measure camber.

Thus, frame selection, which is an optimization step to reduce the computation time, preferably comprises of two steps. First, a frame identification step in which the input video frames are filtered for candidate image frame using the parameters: frame rate of the input video, rolling bench speed and the field of view of the camera; a series of candidate frames can be identified based on the said parameters. Second, a key frame selection step in which the given candidate frame is compared with the previous key frame for determining if there is any difference and needs processing; the frame is divided into blocks of equal size and mean is computed for every block. This mean value of each block is compared with its corresponding block of previous key frame and thus determining the key frame. In this manner, a user is able to set the percentage of overlapping of strip information required in consequent candidate frames, and the percentage of overlapping of strip information in consecutive candidate frame is proportional to the number of frames to be processed. In addition, the series of candidate frames can form an Arithmetic Progression, given the first frame and the parameters: frame rate of the input video, rolling bench speed and the field of view of the camera.

After a key frame is selected, a portion of the image is extracted from the key frame including the surface. The portion to be extracted can be identified through a variety of means, including, for example, pre-processing, enhancement, extraction, and the like. Enhancement of the selected key image frame preferably intensifies the strip object in the image and suppresses the background. As disclosed herein, examples of suitable techniques used to identify and extract a portion of the image include:

Usage of Gamma correction to enhance the image—

Employing gamma correction with appropriate gamma parameter in the image frame appreciates the strip object and depreciates the background.

Usage of region growing to segment the strip object—

Region growing step replaces thresholding, morphology operations and false object removal steps of conventional image processing based approach. It also ensures the extraction of strip object.

Correcting the projective distortion only on the edges—

Applying the perspective correction only on the extracted longitudinal edges (as opposed to existing literatures) minimizes computation.

Figure 6:
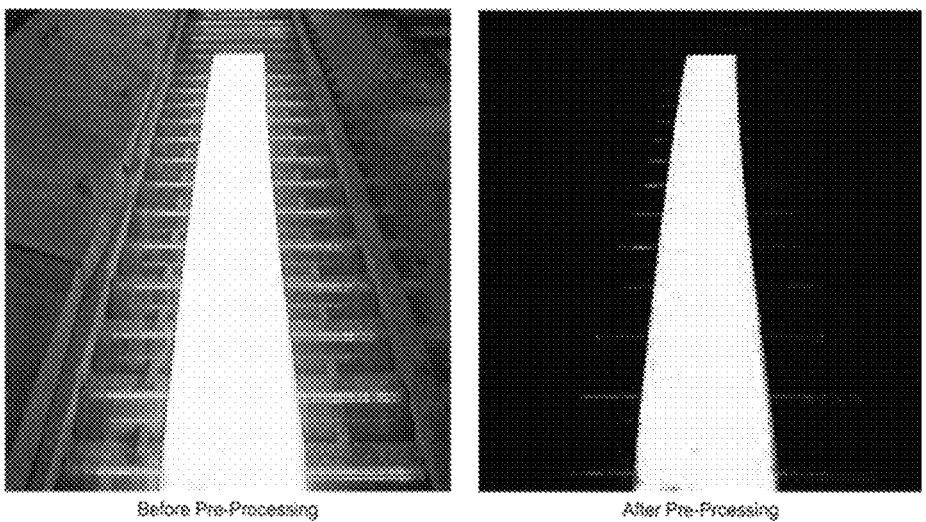
FIG. 6 shows before and after images showing the results of image enhancement according to the disclosed embodiment.

Applying a gamma correction technique can enhance the strip object and suppress the background. Since the strip in the roll will be of very high temperature, the object corresponding to the strip in the image frame will have high pixel intensity values. This phenomenon helps the gamma correction technique with gamma parameter greater than 1 to appreciate the strip object (See FIG. 6). FIG. 6 shows a before and after image resulting from gamma correction.

The strip object can be segmented from the enhanced image frame by selecting a point belonging to the strip object and growing it based on homogeneity criteria, thereby extracting the strip object from the image frame. Thus, the strip object can then segmented from the enhanced image by growing the strip region. The starting point (seed) where the process (seed selection) of growing starts is crucial as it determines the object which is going to be segmented.

Figure 7:
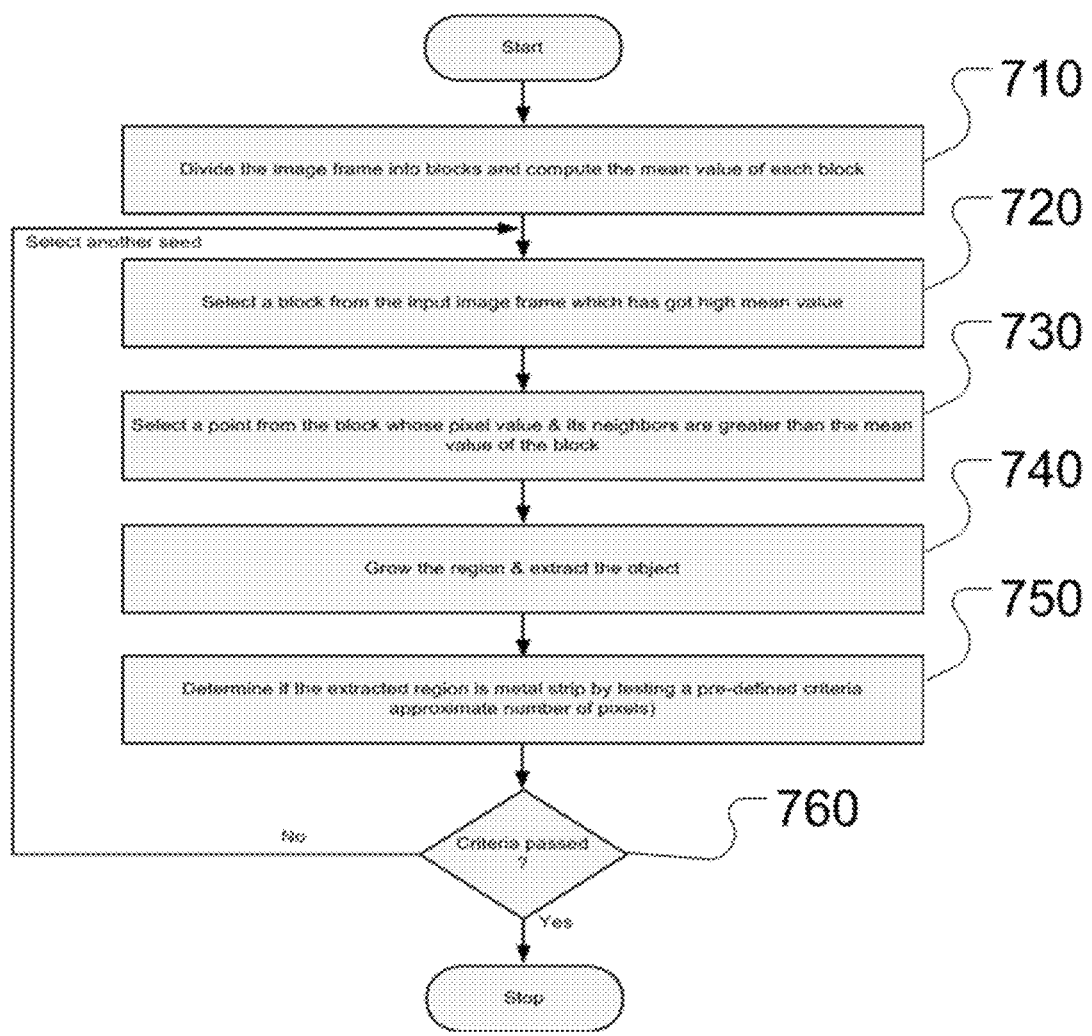
FIG. 7 is a flowchart of a metal strip extraction process according to the disclosed embodiment.
Figure 8:
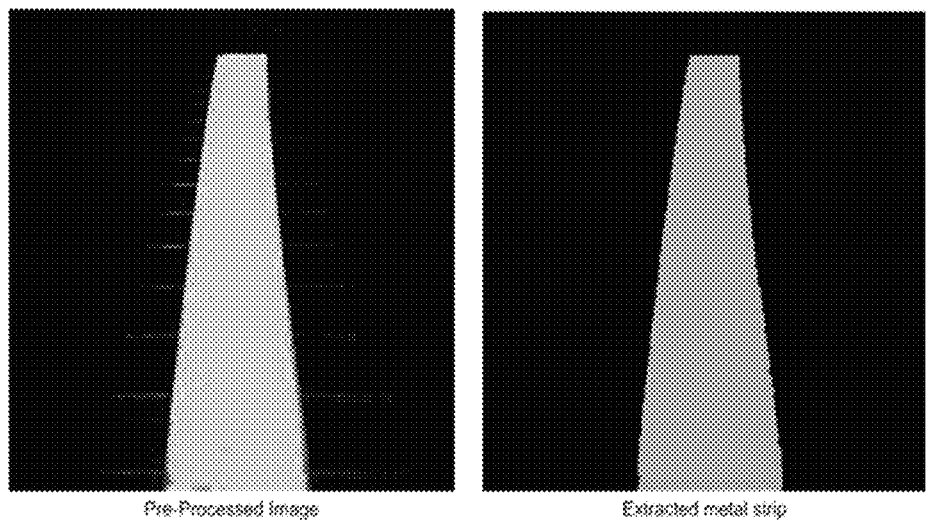
FIG. 8 shows before and after images showing the results of metal strip extraction according to the disclosed embodiment.

The process of seed selection is explained in FIG. 7. In step 710, the image frame is divided into block, and the mean value of each block is computed. Then, in step 720, a block with a high mean value is selected from the input image frame. In step 730, a point is selected from the block which has a pixel value higher than the mean value of the block, and whose neighboring points also have a pixel value higher than the mean value of the block. The region is then grown, and the object is extracted in step 740. It is then determined whether the extracted region is the metal strip by testing a pre-defined criteria, such as approximate number of pixels, in step 750, and determined whether the criteria is passed in step 760. Thus, post region growing, the validation is done using set criteria such as number of pixels in the grown region. As camera is calibrated and the set-up is same, the number of pixels contribute to the strip object will not vary much. This will help in segmenting the strip object from the image frame (See FIG. 8, which shows exemplary pre-processed and extracted images).

Figure 9:
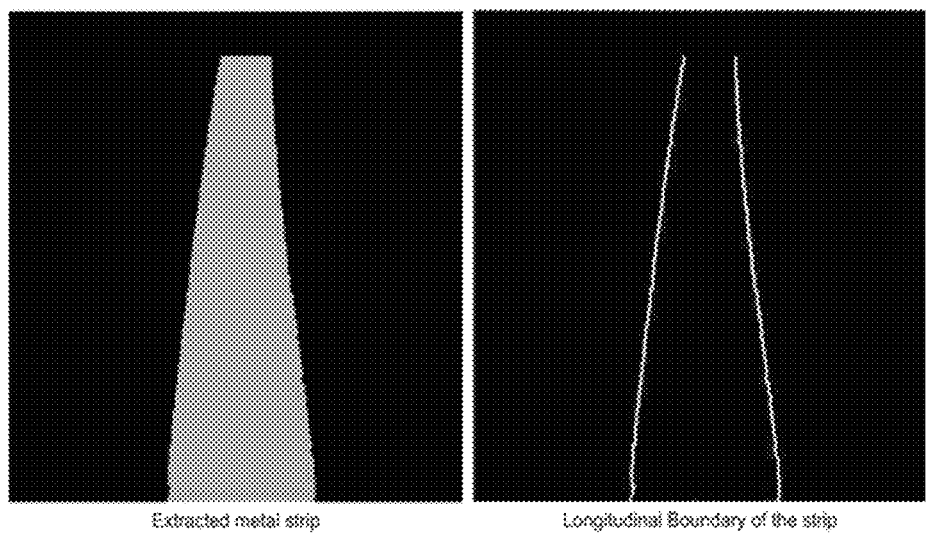
FIG. 9 shows before and after images showing the results of longitudinal boundary extraction according to the disclosed embodiment.
Figure 10:
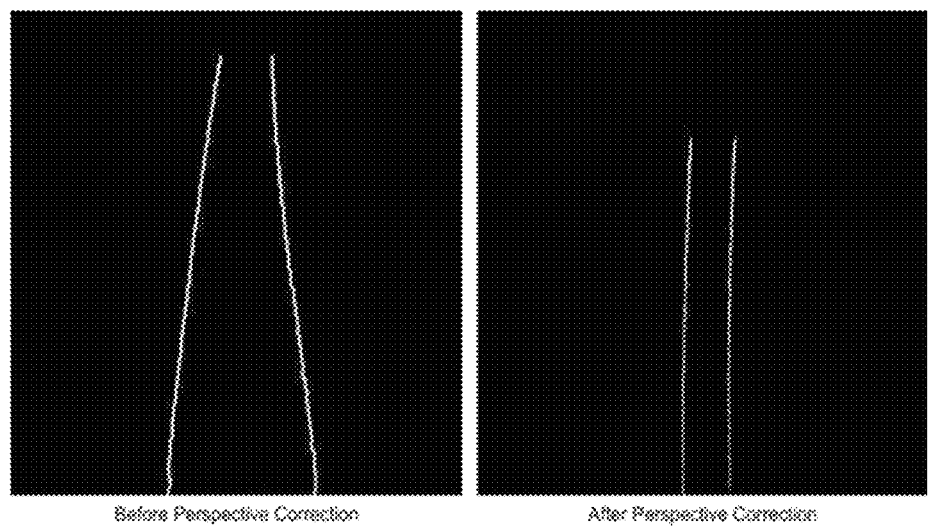
FIG. 10 shows before and after images showing the results of perspective correction according to the disclosed embodiment.

The longitudinal edges of the segmented strip can be extracted and the perspective can be corrected, thereby reducing the distortion introduced by the camera and preparing the edges for camber measurement. Thus, the longitudinal boundaries (i.e. edges) (FIG. 9) of the segmented strip object can be extracted and the projective distortion can be corrected (e.g. perspective correction) (FIG. 10). This approach of applying perspective correction only on longitudinal edges saves computation time as opposed to the available prior arts which correct the projective distortion of the whole strip object.

Thus, the enhancement of key image frame can be done using through gamma correction technique with gamma parameter value greater than 1. In addition, the initial point in region growing, referred as seed hereafter, can be selected from the block of the image frame having high mean value and satisfies the criteria that the selected point and its neighbors have pixel intensity greater than the mean value of the block. Furthermore, the extracted strip can be validated by evaluating set criteria such as the number of pixels in the strip object.

After a portion of the key image has been extracted, the extracted portion is analyzed to thereby determine the camber on the surface. If there is any camber detected, the measured value is fed into the automatic steering control system which adjusts the work rolls to bring back the strip in the center.

Figure 11:
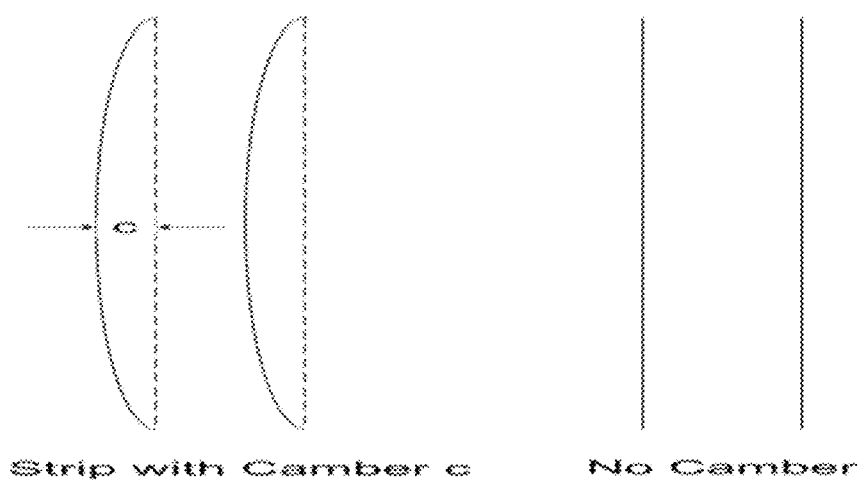
FIG. 11 illustrates a camber measurement according to the disclosed embodiment.
Figure 12:
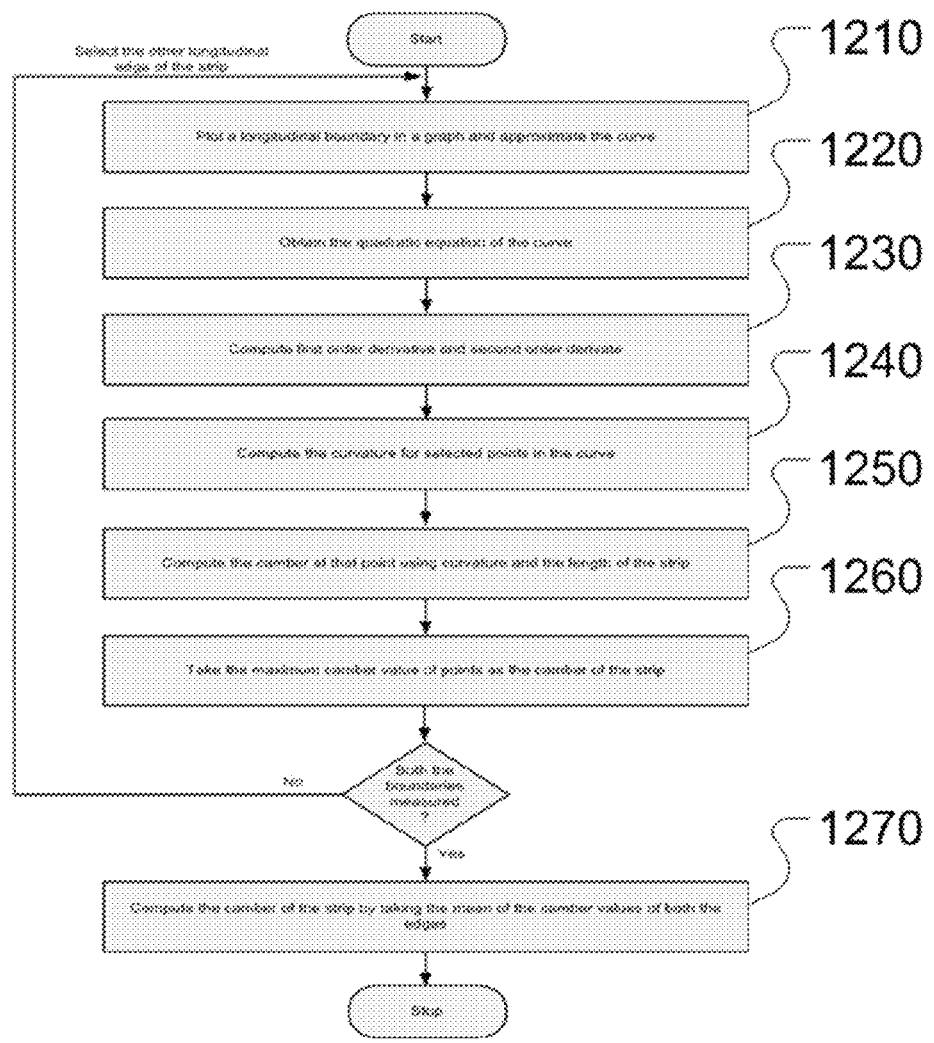
FIG. 12 is a flowchart illustrating exemplary steps to compute camber according to the disclosed embodiment.

The camber can be measured using the perspective corrected edges mathematically, thereby determining the camber of the slab by averaging the camber of both the edges (See FIG. 11). For example, camber is computed from both the perspective corrected longitudinal edges of the strip and the final value of the strip is taken by averaging them. The process of measuring camber is depicted in FIG. 12. In step 1210, a longitudinal boundary is plotted in a graph, and the resulting curve is approximated.

The points of an edge are approximated to a quadratic equation y=f(x). The curvature (k) of the quadratic equation can be measured using the below equation.

$$k = \frac{|y''|}{(1+y'^2)^{2/2}} \quad \text{(Equation 5)}$$

where y' and y" are first and second derivative of y. (Steps 1220-1230)

To cover the entire length of the strip, it is important to select points across the length of the strip based on the criteria such as fixed distance. On these selected points, the curvature (k) value is computed in steps 1240.

Using the value of curvature (k) and the length of strip (L), the camber (c) can be measured in step 1250.

$$c = \frac{k \times L^2}{8} \quad \text{(Equation 6)}$$

Thus, the camber of the strip can be measured by approximating the points of its edge to a quadratic equation and finding out the curvature, thereby measuring camber using the said curvature and the length of the strip. In addition, the curvature can be measured for selected points in the curve represented by the quadratic equation, and the points can be selected from the points of the edge based on the criteria that a fixed distance is maintained between selected points. Furthermore, the camber of an edge can be determined as the maximum camber measured for the selected points in it in step 1260. If both boundaries have been measured, the camber is computed by taking the mean of the camber value of both of the edges in step 1270.

Figure 13:
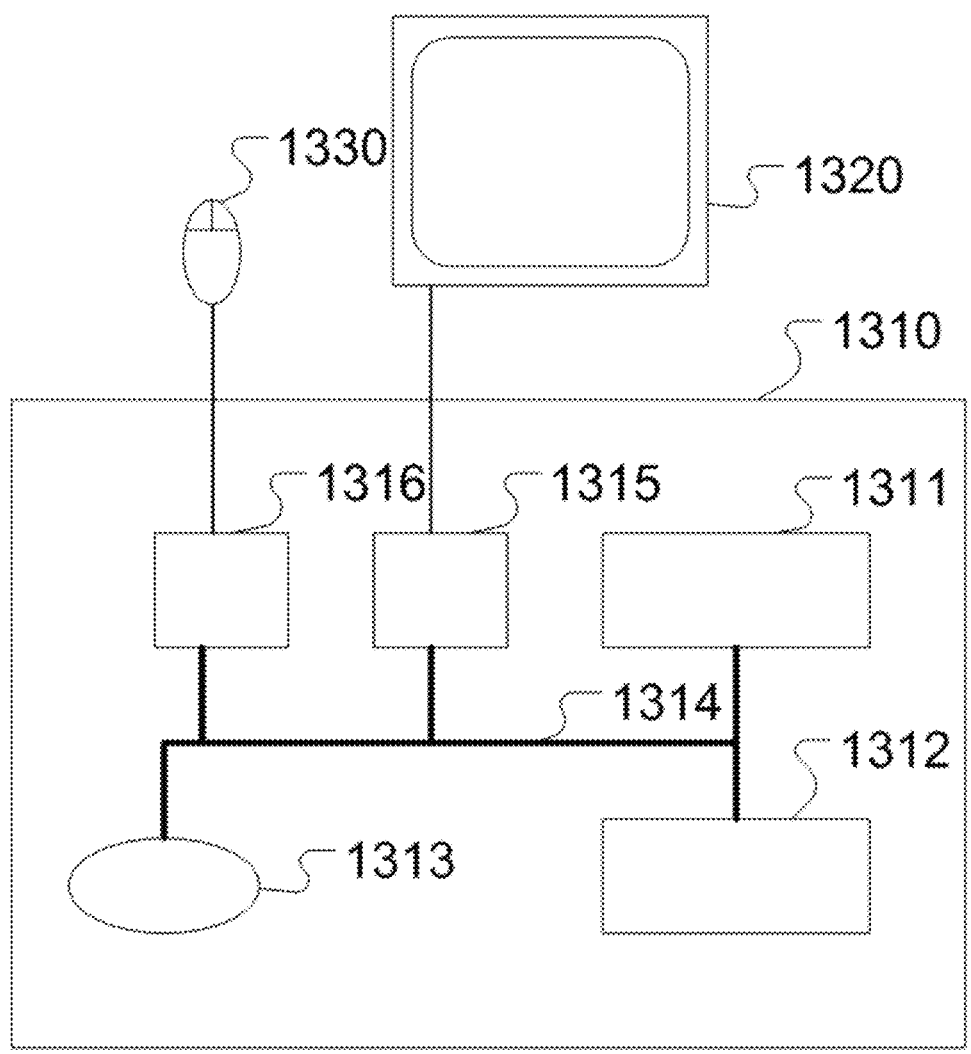
FIG. 13 illustrates an exemplary computing device useful for implementing systems and performing methods disclosed herein.

The embodiments described herein may be implemented with any suitable hardware and/or software configuration, including, for example, modules executed on computing devices such as computing device 1310 of FIG. 13. Embodiments may, for example, execute modules corresponding to steps shown in the methods described herein. Of course, a single step may be performed by more than one module, a single module may perform more than one step, or any other logical division of steps of the methods described herein may be used to implement the processes as software executed on a computing device.

Computing device 1310 has one or more processing device 1311 designed to process instructions, for example computer readable instructions (i.e., code) stored on a storage device 1313. By processing instructions, processing device 1311 may perform the steps set forth in the methods described herein. Storage device 1313 may be any type of storage device (e.g., an optical storage device, a magnetic storage device, a solid state storage device, etc.), for example a non-transitory storage device. Alternatively, instructions may be stored in remote storage devices, for example storage devices accessed over a network or the internet. Computing device 1310 additionally has memory 1312, an input controller 1316, and an output controller 1315. A bus 1314 operatively couples components of computing device 1310, including processor 1311, memory 1312, storage device 1313, input controller 1316, output controller 1315, and any other devices (e.g., network controllers, sound controllers, etc.). Output controller 1315 may be operatively coupled (e.g., via a wired or wireless connection) to a display device 1320 (e.g., a monitor, television, mobile device screen, touch-display, etc.) in such a fashion that output controller 1315 can transform the display on display device 1320 (e.g., in response to modules executed). Input controller 1316 may be operatively coupled (e.g., via a wired or wireless connection) to input device 1330 (e.g., mouse, keyboard, touch-pad, scroll-ball, touch-display, etc.) in such a fashion that input can be received from a user (e.g., a user may input with an input device 1330 a dig ticket).

Of course, FIG. 13 illustrates computing device 1310, display device 1320, and input device 1330 as separate devices for ease of identification only. Computing device 1310, display device 1320, and input device 1330 may be separate devices (e.g., a personal computer connected by wires to a monitor and mouse), may be integrated in a single device (e.g., a mobile device with a touch-display, such as a Smartphone or a tablet), or any combination of devices (e.g., a computing device operatively coupled to a touch-screen display device, a plurality of computing devices attached to a single display device and input device, etc.). Computing device 1310 may be one or more servers, for example a farm of networked servers, a clustered server environment, or a cloud network of computing devices.

While systems and methods are described herein by way of example and embodiments, those skilled in the art recognize that the systems and methods for measuring camber are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

Various embodiments of the disclosed embodiment have been disclosed herein. However, various modifications can be made without departing from the scope of the embodiments as defined by the appended claims and legal equivalents.

What is claimed is:

1. A method for measuring camber on a surface, the method comprising:
   receiving, by a computing device, a video stream of a surface;
   identifying, by a computing device, a key frame of the surface from the video stream by filtering input video frames to identify a candidate image frame using a frame rate of a camera, a speed of a transfer table on which the surface is moving, and a field view of the camera, and by comparing the candidate image frame with a previous key frame by ignoring frames having redundant information;
   extracting, by a computing device, a portion of the key frame including the surface; and
   analyzing, by a computing device, the extracted portion of the key frame to thereby determine the camber on the surface.

2. The method of claim 1, wherein the surface is a moving surface.

3. The method of claim 1, further comprising enhancing, by a computing device, the key frame.

4. The method of claim 1, wherein the portion extracted from the key frame shows the boundaries of the surface.

5. The method of claim 4, further comprising correcting, by a computing device, any perspective distortion of the boundaries of the surface in the extracted portion of the key frame.

6. The method of claim 1, further comprising determining, by a computing device, whether the camber exceeds a predetermined threshold value.

7. A system for measuring camber on a surface, the system comprising:
   a computing device configured to receive a video stream of a surface;
   a computing device configured to identify a key frame of the surface from the video stream by filtering input video frames to identify a candidate image frame using a frame rate of a camera, a speed of a transfer table on which the surface is moving, and a field view of the camera, and by comparing the candidate image frame with a previous key frame by ignoring frames having redundant information;
   a computing device configured to extract a portion of the key frame including the surface; and
   a computing device configured to analyze the extracted portion of the key frame to thereby determine the camber on the surface.

8. The system of claim 7, wherein the surface is a moving surface.

9. The system of claim 7, further comprising a computing device configured to enhance the key frame.

10. The system of claim 7, wherein the portion extracted from the key frame shows the boundaries of the surface.

11. The system of claim 10, further comprising a computing device configured to correct any perspective distortion of the boundaries of the surface in the extracted portion of the key frame.

12. The system of claim 7, further comprising a computing device configured to determine whether the camber exceeds a predetermined threshold value.

13. Computer-readable code stored on non-transitory computer-readable medium that, when executed by a processor, performs a method for measuring camber on a surface, the method comprising:
   receiving, by a computing device, a video stream of a surface;
   identifying, by a computing device, a key frame of the surface from video stream by filtering input video frames to identify a candidate image frame using a frame rate of a camera, a speed of a transfer table on which the surface is moving, and a field view of the camera, and by comparing the candidate image frame with a previous key frame by ignoring frames having redundant information;
   extracting, by a computing device, a portion of the key frame including the surface; and
   analyzing, by a computing device, the extracted portion of the key frame to thereby determine the camber on the surface.

14. The computer-readable code of claim 13, wherein the surface is a moving surface.

15. The computer-readable code of claim 13, wherein the method further comprises enhancing, by a computing device, the key frame.

16. The computer-readable code of claim 13, wherein the portion extracted from the key frame shows the boundaries of the surface.

17. The computer-readable code of claim 16, wherein the method further comprises correcting, by a computing device, any perspective distortion of the boundaries of the surface in the extracted portion of the key frame.

18. The computer-readable code of claim 13, wherein the method further comprises determining, by a computing device, whether the camber exceeds a predetermined threshold value.

19. The method of claim 1, wherein the candidate image frame is identified by performing the following equation:

$$N = \frac{C \times F}{S}$$

wherein "C" is the field view, "F" is the frame rate, "S" is the speed of the transfer table, and "N" is the number of frames in the input video.

20. The method of claim 19, wherein if overlapping is desired to increase accuracy, the candidate image frame is identified by performing the following equation:

$$N = \frac{C \times F}{S} \times \frac{1 - X}{100}$$

wherein "X" is a configured overlapping percentage.

21. The system of claim 7, wherein the candidate image frame is identified by performing the following equation:

$$N = \frac{C \times F}{S}$$

wherein "C" is the field view, "F" is the frame rate, "S" is the speed of the transfer table, and "N" is the number of frames in the input video.

22. The system of claim 21, wherein if overlapping is desired to increase accuracy, the candidate image frame is identified by performing the following equation:

$$N = \frac{C \times F}{S} \times \frac{1 - X}{100}$$

wherein "X" is a configured overlapping percentage.

23. The computer readable code claim 13, wherein the candidate image frame is identified by performing the following equation:

$N = C \times F/S$ wherein "C" is the field view, "F" is the frame rate, "S" is the speed of the transfer table, and "N" is the number of frames in the input video.

24. The computer readable code claim 23, wherein if overlapping is desired to increase accuracy, the candidate image is identified by performing the following equation:

$N = C \times F/S \times 1 - X/100$ wherein "X" is a configured overlapping percentage.

* * * * *